US009815197B1

(12) United States Patent
Pickover et al.

(10) Patent No.: US 9,815,197 B1
(45) Date of Patent: Nov. 14, 2017

(54) DEVICE, SYSTEM AND METHOD FOR TRACKING AND REPLACING LIGHTS WITH AUTOMATED VEHICLES

(71) Applicant: INTERNATIONAL BUSINESS MACHINES CORPORATION, Armonk, NY (US)

(72) Inventors: Clifford A. Pickover, Yorktown Heights, NY (US); Maja Vukovic, New York, NY (US); Michael Karl Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/189,666

(22) Filed: Jun. 22, 2016

(51) Int. Cl.
| | |
|---|---|
| *G01C 22/00* | (2006.01) |
| *G05D 1/00* | (2006.01) |
| *B25J 9/16* | (2006.01) |
| *B25J 5/00* | (2006.01) |
| *G01C 21/20* | (2006.01) |
| *G01C 21/34* | (2006.01) |
| *G05D 1/02* | (2006.01) |

(52) U.S. Cl.
CPC ............ *B25J 9/1661* (2013.01); *B25J 5/00* (2013.01); *B25J 9/161* (2013.01); *B25J 9/162* (2013.01); *B25J 9/1679* (2013.01); *G01C 21/20* (2013.01); *G01C 21/34* (2013.01); *G01C 21/3407* (2013.01); *G05D 1/00* (2013.01); *G05D 1/02* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 5,369,363 A | 11/1994 | Hey | |
| 8,256,329 B2 | 9/2012 | Ota | |
| 2010/0024606 A1 | 2/2010 | Becker | |
| 2016/0309341 A1* | 10/2016 | Priest | B64C 39/022 |

OTHER PUBLICATIONS

Garcia et al., "Automatic robotic tasks in unstructured environments using an image path tracker," Nov. 25, 2009.*

(Continued)

*Primary Examiner* — Lail Kleinman
(74) *Attorney, Agent, or Firm* — F. Chau & Associates, LLC

(57) ABSTRACT

A light bulb replacement system includes a database that stores location data for light bulbs, light bulb type data, and installation history data. A first processor generates a replacement score for each of the light bulbs using at least one of the location data, the type data, and the installation history data; compares the replacement score of each of the light bulbs to a threshold replacement score; and creates a replacement list. The light bulb replacement system includes an automated light bulb replacement vehicle including a first location sensor; a first memory configured to store the replacement list, and store location data, type data, and installation history data corresponding to each light bulb in the replacement list. A second processor navigates the automated light bulb replacement vehicle. A light bulb coupling/decoupling mechanism replaces an existing light bulb with a new light bulb.

20 Claims, 9 Drawing Sheets

(56) References Cited

OTHER PUBLICATIONS

Tan, Chenhao, et al. "Social action tracking via noise tolerant time-varying factor graphs." Proceedings of the 16th ACM SIGKDD international conference on Knowledge discovery and data mining. ACM, 2010.
Garcia, G. J., J. Pomares, and F. Torres. "Automatic robotic tasks in unstructured environments using an image path tracker." Control Engineering Practice 17.5 (2009): 597-608.
Manschitz, Simon, et al. "Learning to unscrew a light bulb from demonstrations." ISR/Robotik 2014; 41st International Symposium on Robotics; Proceedings of. VDE, 2014.
Neese, David, "Lego Light Bulb Changer" YouTube, published Sep. 5, 2010 [online at the internet:<URL: https://www.youtube.com/watch?v=xMrk0efv6SE]. [Last Visited Jun. 14, 2016].
Guedon-Thomann, David, "Robot change light bulb CAD" YouTube, published Mar. 18, 2013 [online at the Internet: <URL: https://www.youtube.com/watch?v=-WYQfBy43qQ]. [Last Visited Jun. 14, 2016].
Wyman, Jeffrey, "Autonomous Bulb Replacing Robot" YouTube, published Feb. 18, 2016 [online at the Internet: <URL: https://www.youtube.com/watch?v=mmVllq9otNE]. [Last Visited Jun. 14, 2016].
Bunch, David, "Highway lights throughout area to be repaired, replaced" C&G Newspapers, published Dec. 16, 2015 [online at the internet:<URL: http://www.candgnews.com/news/highway-lights-throughout-area-be-repaired-replaced-88805]. [Last Visited Jun. 14, 2016].

\* cited by examiner

DEVICE, SYSTEM AND METHOD FOR TRACKING AND REPLACING LIGHTS WITH AUTOMATED VEHICLES

BACKGROUND

Exemplary embodiments of the present invention relate to a device, system and method for replacing lights with a drone.

Street and walkway lights may be disposed relatively high from the ground. For example, street and walkway lights may be disposed on light poles or lampposts. Street and walkway lights may also be disposed in rural or relatively lightly traveled areas. Alternatively, street and walkway lights may be disposed in high traffic areas with limited safe access space surrounding light poles or lampposts. Thus, street and walkway lights may be relatively inaccessible to human maintenance or repair people due to travel times and/or physical restraints to gaining access to such lights. For example, it may be relatively difficult to physically access a broken or burned out light on a light pole disposed in a central area of a busy roadway.

Both urban and rural areas may include a relatively large number of street or walkway lights. Such lights may include a plurality of types of bulbs (e.g., LED, CFL) having different and/or variable life spans. Thus, monitoring of broken, damaged or burned out lights may be difficult. Additionally, light bulbs included in street lights and walkway lights may have variable brightness over the course of their life span. For example, the lighting capacity of individual light bulbs may decline as they reach the end of their life span, which may result in a reduction in visibility in walkways or roadways near fading light bulbs.

SUMMARY

Exemplary embodiments of the present invention provide a light bulb replacement system including a database that stores location data indicating a location of each of a plurality of light bulbs, type data indicating a type of each of the light bulbs, and installation history data indicating a time at which each of the light bulbs was installed. A first processor is configured to generate a replacement score for each of the light bulbs using at least one of the location data, the type data, and the installation history data; compare the replacement score of each of the light bulbs to a threshold replacement score; and create a replacement list comprising at least one of the light bulbs. Each light bulb in the replacement list has a replacement score that is higher than the threshold replacement score. The light bulb replacement system includes an automated light bulb replacement vehicle including a first location sensor configured to detect a current location of the automated light bulb replacement vehicle; a first memory configured to store the replacement list, and store the location data, the type data, and the installation history data corresponding to each light bulb in the replacement list; a second processor configured to navigate the automated light bulb replacement vehicle to at least one light bulb in the replacement list; and a light bulb coupling/decoupling mechanism configured to replace an existing light bulb with a new light bulb by decoupling the existing light bulb from a light bulb receptacle and coupling the new light bulb to the light bulb receptacle.

According to an exemplary embodiment of the present invention, the first processor may be configured to generate the replacement score by identifying an average lifetime of each of the light bulbs by cross-referencing the type of each light bulb with average lifetime data that indicates the average lifetime of different types of light bulbs; and determining an expected failure time of each of the light bulbs based on the average lifetime of each light bulb and the installation history data indicating the time at which each light bulb was installed. The replacement scores of the light bulbs may increase as the expected failure times of the light bulbs become closer.

According to an exemplary embodiment of the present invention, the first processor may be configured to generate the replacement score by identifying at least one light bulb installed in a high danger area by cross-referencing the location data of each light bulb with high danger data indicating areas in which proper lighting is classified as a safety concern; and increasing the replacement score of the at least one light bulb installed in the high danger area by a predefined amount.

According to an exemplary embodiment of the present invention, the high danger area may correspond to an area having a high crime rate or an area having a high vehicle accident rate.

According to an exemplary embodiment of the present invention, the first processor may be configured to generate the replacement score by identifying at least one light bulb that has received a previous replacement request; and increasing the replacement score of the at least one light bulb that has received the previous replacement request by a predefined amount.

According to an exemplary embodiment of the present invention, the first processor may be configured to identify at least one light bulb installed in a high danger area by cross-referencing the location data of each light bulb with high danger data indicating areas in which proper lighting is classified as a safety concern; and prioritize replacement of the at least one light bulb installed in the high danger area.

According to an exemplary embodiment of the present invention, the high danger area may correspond to an area having a high crime rate or an area having a high vehicle accident rate.

According to an exemplary embodiment of the present invention, the first processor may be configured to identify at least one light bulb that has received a previous replacement request; and prioritize replacement of the at least one light bulb that has received the previous replacement request.

According to an exemplary embodiment of the present invention, the automated light bulb replacement vehicle may include a radio-frequency identification (RFID) reader configured to read an RFID tag disposed near at least one of the light bulbs. At least one of the location data, the type data, and the installation history data corresponding to the at least one light bulb may be read from the RFID tag by the RFID reader.

According to an exemplary embodiment of the present invention, the automated light bulb replacement vehicle may include a network interface configured to transmit the at least one of the location data, the type data, and the installation history data corresponding to the at least one light bulb and read from the RFID tag by the RFID reader to the database.

According to an exemplary embodiment of the present invention, the automated light bulb replacement vehicle may include a spectral sensor configured to detect spectral characteristics of each light bulb in the replacement list. Each light bulb in the replacement list might be replaced when corresponding spectral characteristics are abnormal.

According to an exemplary embodiment of the present invention, the light bulb replacement system may include an automated light bulb supply vehicle including a second location sensor configured to detect a current location of the automated light bulb supply vehicle; a second memory configured to store the replacement list, and store the location data, the type data, and the installation history data corresponding to each light bulb in the replacement list; a third processor configured to navigate the automated light bulb supply vehicle to the at least one light bulb in the replacement list in coordination with the automated light bulb replacement vehicle; and a light bulb supply mechanism configured to transfer the new light bulb from the automated light bulb supply vehicle to the automated light bulb replacement vehicle.

According to an exemplary embodiment of the present invention, the automated light bulb replacement vehicle may include a recycling mechanism configured to crush the existing light bulb and separate different materials of the existing light bulb. The automated light bulb supply vehicle may include a plurality of recycling receptacles configured to respectively store the different materials of the existing light bulb received from the automated light bulb replacement vehicle.

According to an exemplary embodiment of the present invention, the new light bulb may be one of a plurality of new light bulbs included in a light bulb cartridge. The light bulb supply mechanism of the automated light bulb supply vehicle may be configured to transfer the light bulb cartridge to the automated light bulb replacement vehicle.

Exemplary embodiments of the present invention provide a light bulb replacement system including a database that stores location data indicating a location of each of a plurality of light bulbs, type data indicating a type of each of the light bulbs, and installation history data indicating a time at which each of the light bulbs was installed; and a first processor configured to create a replacement list comprising at least one of the light bulbs. The replacement list is created based on at least one of the location data, the type data, and the installation history data. The light bulb replacement system includes an automated light bulb replacement vehicle including a location sensor configured to detect a current location of the automated light bulb replacement vehicle; a memory configured to store the replacement list, and store the location data, the type data, and the installation history data corresponding to each light bulb in the replacement list; a second processor configured to navigate the automated light bulb replacement vehicle to at least one light bulb in the replacement list; and a light bulb coupling/decoupling mechanism configured to replace an existing light bulb with a new light bulb by decoupling the existing light bulb from a light bulb receptacle and coupling the new light bulb to the light bulb receptacle.

According to an exemplary embodiment of the present invention, the first processor may be configured to identify at least one light bulb installed in a high danger area by cross-referencing the location data of each light bulb with high danger data indicating areas in which proper lighting is classified as a safety concern; and prioritize replacement of the at least one light bulb installed in the high danger area. The high danger area may correspond to an area having a high crime rate or an area having a high vehicle accident rate.

According to an exemplary embodiment of the present invention, the first processor may be configured to identify at least one light bulb that has received a previous replacement request and prioritize replacement of the at least one light bulb that has received the previous replacement request.

Exemplary embodiments of the present invention provide a light bulb replacement method including storing, in a database, location data indicating a location of each of a plurality of light bulbs, type data indicating a type of each of the light bulbs, and installation history data indicating a time at which each of the light bulbs was installed; generating, by a first processor, a replacement score for each of the light bulbs using at least one of the location data, the type data, and the installation history data; and comparing, by the first processor, the replacement score of each of the light bulbs to a threshold replacement score. The method further includes creating, by the first processor, a replacement list comprising at least one of the light bulbs, wherein each light bulb in the replacement list has a replacement score that is higher than the threshold replacement score; detecting, by a location sensor of an automated light bulb replacement vehicle, a current location of the automated light bulb replacement vehicle; and storing, in a memory of the automated light bulb replacement vehicle, the replacement list. The method further includes storing, in the memory of the automated light bulb replacement vehicle, the location data, the type data, and the installation history data corresponding to each light bulb in the replacement list; navigating, by a second processor of the automated light bulb replacement vehicle, the automated light bulb replacement vehicle to at least one light bulb in the replacement list; and replacing, by a light bulb coupling/decoupling mechanism of the automated light bulb replacement vehicle, an existing light bulb with a new light bulb by decoupling the existing light bulb from a light bulb receptacle and coupling the new light bulb to the light bulb receptacle.

According to an exemplary embodiment of the present invention, the replacement score may be generated by identifying an average lifetime of each of the light bulbs by cross-referencing the type of each light bulb with average lifetime data that indicates the average lifetime of different types of light bulbs; and determining an expected failure time of each of the light bulbs based on the average lifetime of each light bulb and the installation history data indicating the time at which each light bulb was installed. The replacement scores of the light bulbs may increase as the expected failure times of the light bulbs become closer.

According to an exemplary embodiment of the present invention, the replacement score may be generated by identifying at least one light bulb installed in a high danger area by cross-referencing the location data of each light bulb with high danger data indicating areas in which proper lighting is classified as a safety concern; and increasing the replacement score of the at least one light bulb installed in the high danger area by a predefined amount

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
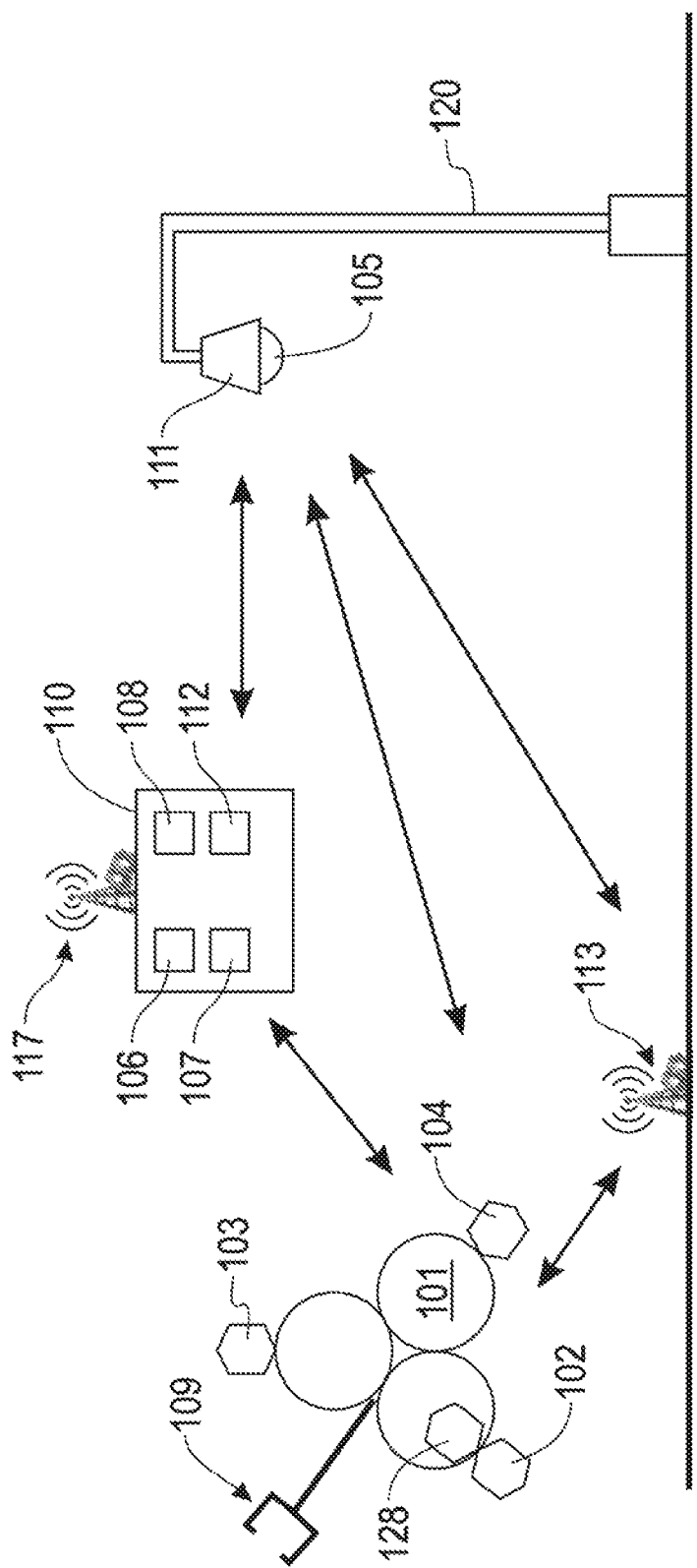
FIG. 1 illustrates a light bulb replacement system according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

A street light, light pole, lamppost, street lamp, light standard, or lamp standard is a raised source of light, which may be disposed on the edge of a road or walkway. Modern lamps may include light-sensitive photocells that activate automatically when light is or is not needed (e.g., at dusk, dawn, or the onset of dark weather). Many street light systems are being connected underground instead of wiring from one utility post to another.

One or more exemplary embodiments of the present invention include a flying drone equipped to carry one or more light bulbs and types of light bulbs (e.g. LED, CFL, pre-loaded in a carousel), a means for said drone to estimate a desire/need/risk for a bulb replacement on a road light pole or other high place, and a means for replacing old bulb with new bulb and carrying away or recycling the old bulb.

A method and system according to one or more exemplary embodiments of the present invention may include monitoring and/or controlling the flying drone equipped to carry one or more light bulbs and types of light bulbs (e.g. LED, CFL, pre-loaded in a carousel).

One or more exemplary embodiments of the present invention provides a safety feature, given that changing bulbs by a human is fraught with danger and expense (e.g. accidents for the humans, getting burned, getting hit by cars, getting electrocuted, and/or creating traffic jams).

Light bulb types according to an exemplary embodiment of the present invention may include incandescent bulbs, fluorescent lamps, compact fluorescent lamps (CFL), cold cathode fluorescent lamps (CCFL), high-intensity discharge lamps, light-emitting diode lamps (LED), plug-in CFLS, Halogen light bulbs, Antique Light Bulbs, Reproduction Incandescent Bulbs, Induction Lamps, High Intensity Discharge HID Lights, Fluorescent Tubes, Colored Bulbs, Stage and Studio, Shatter Resistant, Miniature Indicator, GU24 Twist and Lock Light Bulbs, PAR36 Reflector, Medical and Dental, Black Light, Germicidal Ultraviolet, and Full Spectrum lights. However, exemplary embodiments of the present invention are not limited thereto, and any desired light bulb may be monitored and/or replaced, as described herein.

The light bulbs according to an exemplary embodiment of the present invention may be mounted in high-up street lights on poles, on sides of buildings, or along roadways and/or walkways. However, exemplary embodiments of the present invention are not limited thereto, and light bulbs may be disposed in any desired location.

According to an exemplary embodiment of the present invention, light bulbs may be changed in response to: detection of bulb burned out, detection of bulb dimming or changing spectral characteristics, a database on the age of bulbs and time of last replacement, a history of expected bulb lifetimes for a class of bulbs.

Exemplary embodiments of the present invention will be described more fully hereinafter with reference to the accompanying drawings. Like reference numerals may refer to like elements throughout the specification and drawings.

FIG. 1 illustrates a light bulb replacement system according to an exemplary embodiment of the present invention.

Referring to FIG. 1, exemplary embodiments of the present invention provide a light bulb replacement system including a database 110 that stores location data indicating a location of each of a plurality of light bulbs 105, type data indicating a type of each of the light bulbs 105, and installation history data indicating a time at which each of the light bulbs 105 was installed. A first processor 106 is configured to generate a replacement score for each of the light bulbs 105 using at least one of the location data, the type data, and the installation history data; compare the replacement score of each of the light bulbs 105 to a threshold replacement score; and create a replacement list comprising at least one of the light bulbs 105. Each light bulbs 105 in the replacement list has a replacement score that is higher than the threshold replacement score. The light bulb replacement system includes an automated light bulb replacement vehicle 101 including a first location sensor 104 configured to detect a current location of the automated light bulb replacement vehicle 101; a first memory 128 configured to store the replacement list, and store the location data, the type data, and the installation history data corresponding to each light bulb 105 in the replacement list; a second processor 102 configured to navigate the automated light bulb replacement vehicle 101 to at least one light bulb 105 in the replacement list; and a light bulb coupling/decoupling mechanism 109 configured to replace an existing light bulb with a new light bulb by decoupling the existing light bulb from a light bulb receptacle 111 and coupling the new light bulb to the light bulb receptacle 111.

The automated light bulb replacement vehicle 101 may be a drone, such as a flying drone. However, exemplary embodiments of the present invention are not limited thereto, and the automated light bulb replacement vehicle 101 may be any desired vehicle. The terms automated light bulb replacement vehicle, drone and flying drone may be used interchangeably herein.

According to an exemplary embodiment of the present invention, the light bulb coupling/decoupling mechanism 109 may include a robotic or automatic mechanism for unscrewing a light bulb 105. For example, the light bulb coupling/decoupling mechanism 109 may include a substantially hollow elongated rod member having a predetermined shape, size and length and formed of a first predetermined material. An extendable member may be disposed within the substantially hollow elongated rod member, the extendable member having a second predetermined length and is formed of a second predetermined material. A locking means may be engageable with the rod member and the extendable member for adjusting the length of the apparatus. A replaceable vacuum cup having a predetermined shape may be disposed on a first end of the extendable member for attachment to such light bulb 105. A vacuum pump may be disposed adjacent a bottom portion of the rod member, such pump may be engageable with the cup for creating a vacuum in the cup for securing such light bulb 105 therein. A vacuum release button may be disposed on the pump for releasing the vacuum.

According to an exemplary embodiment of the present invention, the light bulb coupling/decoupling mechanism 109 may include a tool for removing and replacing a light bulb 105 including a long handle rod, a chuck at an upper end of the handle rod, and an operating mechanism at a lower end of the handle rod for actuating the chuck. The chuck may include an arm holder, bearing brackets, chuck arms pivotally supported by the bearing brackets, tension springs for closing the chuck arms, a seat pad for receiving and supporting a top surface of the glass sphere of the light bulb 105, guide bars for opening the chuck arms, and a movable bar-holder-block connected to the operation mechanism for supporting the guide bars. When the movable bar-holder-block is pulled downward by the operating mechanism, the upper end portions of the chuck arms may be operatively opened away from one another.

According to an exemplary embodiment of the present invention, the light bulb coupling/decoupling mechanism 109 may include a robot including a robot arm. The robot may have vision in 3D space and may include one or more force sensors and a camera. The robot may be configured to operate in a real and unstructured environment. The robot may include a Barrett hand.

A position of the automated light bulb replacement vehicle 101 may be determined by using a visual servoing approach, and a force applied from the light bulb coupling/decoupling mechanism 109 may be determined by an end-effector. Visual servoing refers to a technique which uses feedback information extracted from a vision sensor (visual feedback) to control the motion of a robot. In this way, the light bulb coupling/decoupling mechanism 109 of the automated light bulb replacement vehicle 101 may be able to "see" and "feel." Control of the light bulb coupling/decoupling mechanism 109 may performed using strain gauge measurements of the Barrett hand located at the end-effector.

The light bulbs 105 and the light bulb housing 111 may be disposed on a light pole 120. However, exemplary embodiments of the present invention are not limited thereto. For example, the light bulbs 105 and/or the light bulb housing 111 may be disposed on a side of a building or on a suspended cable above a roadway.

Figure 4:
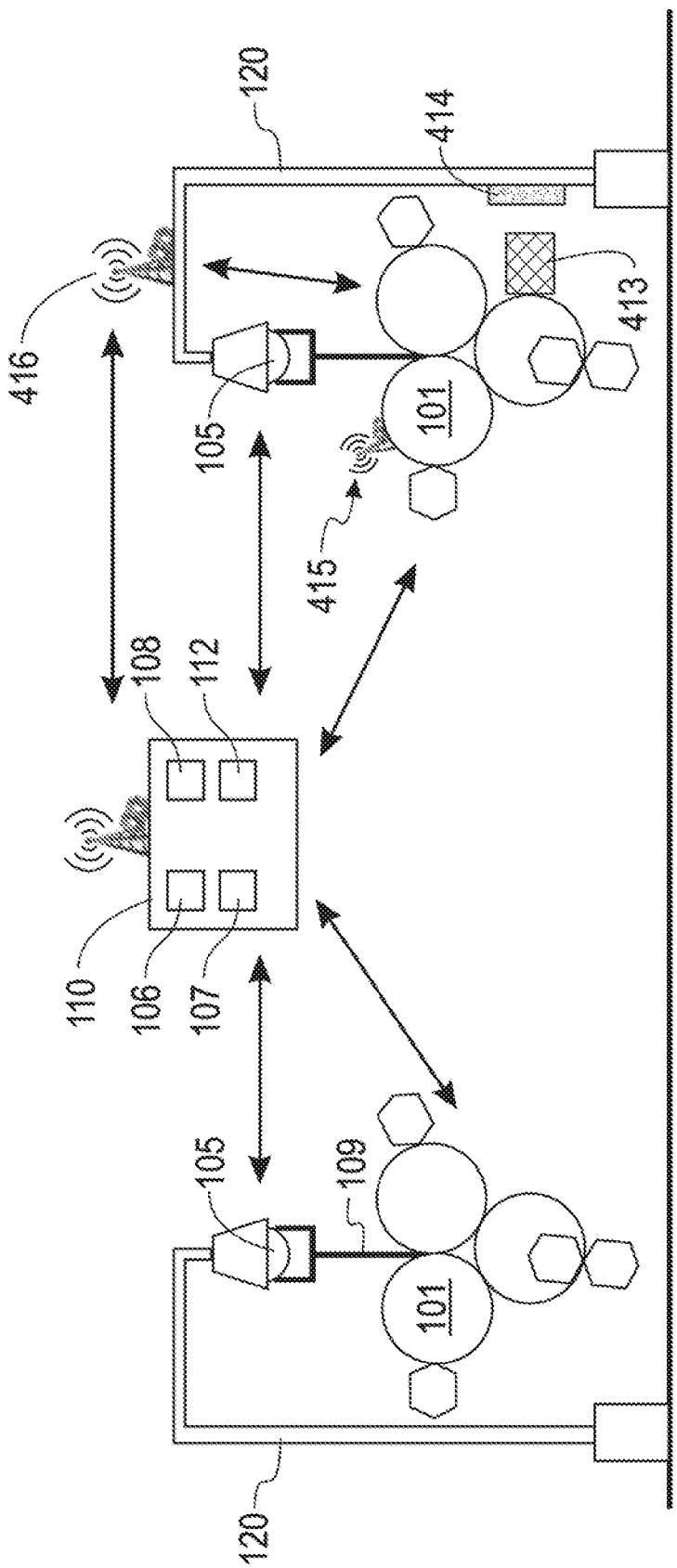
FIG. 4 illustrates a light bulb replacement system including an RDID tag and reader according to an exemplary embodiment of the present invention.

According to an exemplary embodiment of the present invention, the automated light bulb replacement vehicle 101 may include a network interface 103 configured to transmit the at least one of the location data, the type data, and the installation history data corresponding to the at least one light bulb 105 and read from an RFID tag by an RFID reader to the database (see, FIG. 4).

According to an exemplary embodiment of the present invention, the automated light bulb replacement vehicle 101 may communicate directly with the database 110 and/or the light bulb 105 (and/or the light bulb receptacle 111 and the light pole 120 associated with the light bulb 105). Alternatively, the automated light bulb replacement vehicle 101 may communicate with the database 110 and/or the light bulb 105 (and/or the light bulb receptacle 111 and the light pole 120 associated with the light bulb 105) through a first communication antenna 113, such as through cell phone tower communication system. All of the communication antennas described herein may operate through a cell phone tower communication system.

The database 110 may include a second communication antenna 117 for communication with the automated light bulb replacement vehicle 101 and/or the light bulb 105 (and/or the light bulb receptacle 111 and the light pole 120 associated with the light bulb 105). The database may include a third location sensor 107 for determining and/or monitoring the location of one or more the automated light bulb replacement vehicles 101. The database may include a fourth location sensor 112 for determining and/or monitoring the location of an automated light bulb supply vehicle, which is described in more detail below with reference to FIG. 5.

According to an exemplary embodiment of the present invention, the first processor 106 may be configured to generate the replacement score by identifying an average lifetime of each of the light bulbs 105 by cross-referencing the type of each light bulb 105 with average lifetime data that indicates the average lifetime of different types of light bulbs; and determining an expected failure time of each of the light bulbs 105 based on the average lifetime of each light bulb 105 and the installation history data indicating the time at which each light bulb 105 was installed. The replacement scores of the light bulbs 105 may increase as the expected failure times of the light bulbs 105 become closer.

According to an exemplary embodiment of the present invention, the first processor 106 may be configured to generate the replacement score by identifying at least one light bulb 105 installed in a high danger area by cross-referencing the location data of each light bulb 105 with high danger data indicating areas in which proper lighting is classified as a safety concern; and increasing the replacement score of the at least one light bulb 105 installed in the high danger area by a predefined amount.

According to an exemplary embodiment of the present invention, the high danger area may correspond to an area having a high crime rate or an area having a high vehicle accident rate.

According to an exemplary embodiment of the present invention, the first processor 106 may be configured to generate the replacement score by identifying at least one light bulb 105 that has received a previous replacement request; and increasing the replacement score of the at least one light bulb 105 that has received the previous replacement request by a predefined amount. For example, an individual may manually request replacement of a light bulb 105. The individual manually entering the light bulb replacement request may be someone physically or visually inspecting the light pole 120 associated with a particular light bulb 105. A replacement history request for each of a plurality of light poles 120 may be stored in the database 110 (e.g., in a third memory 108). The replacement history may be employed in determining a burnout rate of particular light pole 120. For example, a particular light pole 120 may be disposed in a high fog area, which experiences greater than normal periods of darkness, and thus light bulbs 105 in such an area may burn out at a faster rate. Thus, the replacement history may indicate that a light bulb 105 associated with a particular light pole 120 may require relatively frequent replacement.

According to an exemplary embodiment of the present invention, the first processor 106 may be configured to identify at least one light bulb 105 installed in a high danger area by cross-referencing the location data of each light bulb 105 with high danger data indicating areas in which proper lighting is classified as a safety concern; and prioritize replacement of the at least one light bulb 105 installed in the high danger area.

According to an exemplary embodiment of the present invention, the high danger area may correspond to an area having a high crime rate or an area having a high vehicle accident rate.

According to an exemplary embodiment of the present invention, the first processor 106 may be configured to identify at least one light bulb 105 that has received a previous replacement request; and prioritize replacement of the at least one light bulb 105 that has received the previous replacement request.

According to an exemplary embodiment of the present invention the database 110 may be stored in and accessed from the cloud (e.g., through an Internet connection).

Figure 2:
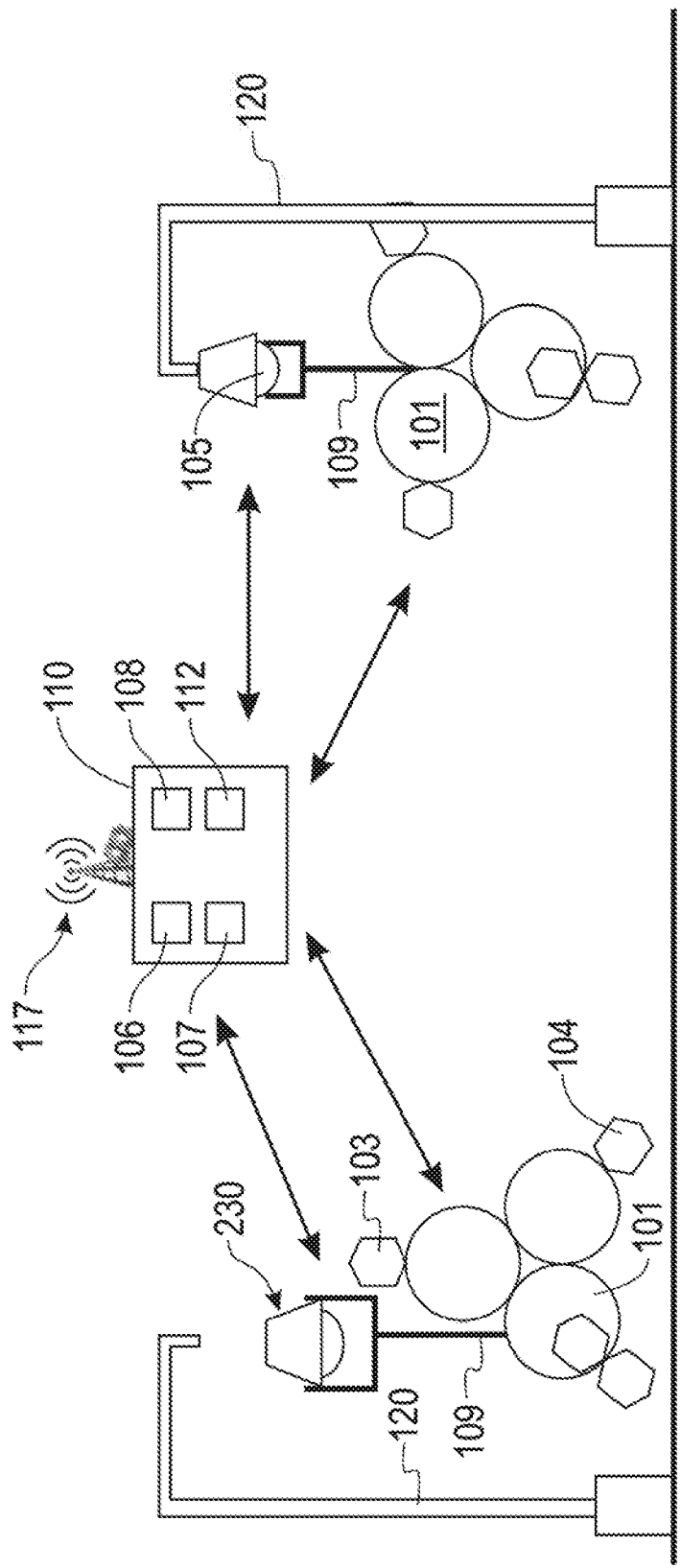
FIG. 2 illustrates a light bulb replacement system including a detachable light bulb cartridge according to an exemplary embodiment of the present invention.
Figure 3:
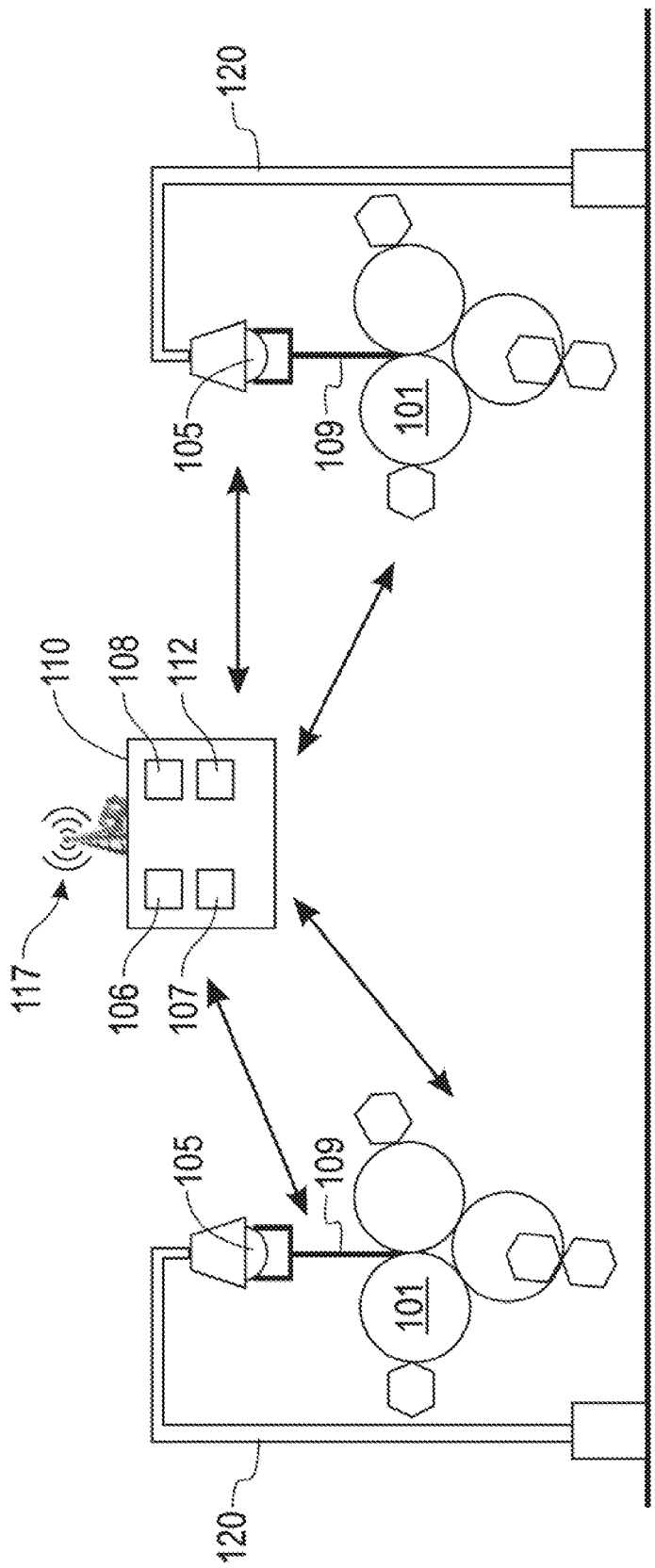
FIG. 3 illustrates a light bulb replacement system including a plurality of automated light bulb replacement vehicles according to an exemplary embodiment of the present invention.

FIG. 2 illustrates a light bulb replacement system including a detachable light bulb cartridge according to an exemplary embodiment of the present invention. FIG. 3 illustrates a light bulb replacement system including a plurality of automated light bulb replacement vehicles according to an exemplary embodiment of the present invention.

Referring to FIGS. 2 and 3, the database 110 may monitor, communicate with and control a plurality of automated light bulb replacement vehicles 101, which may be dispatched to monitor and/or change light bulbs 105 in a plurality of light poles 120. Multiple automated light bulb replacement vehicles 101 of the plurality of automated light bulb replacement vehicles 101 may work collaboratively to change a single particular light bulb 105.

Automated light bulb replacement vehicles 101 may collaboratively manage and/or change light bulbs 105. For example, light bulbs 105 may be monitored and changes in large venues such as, sports stadiums and concert halls. According to an exemplary embodiment of the present invention, drones may employ vision, coupled with capability to infer and comprehend current activities of large masses of people in the context and location target. This information can be used to predict activities of the crowd and/or operation of machinery, for example, in manufacturing plants or storage or data center buildings. Algorithms, such as NTT, may be used to monitor and predict activities of the humans which will help drones identify the right timing of bulb changes. Drones may collaborate and join forces when changing lights under different contexts, e.g. street lights in remote areas, helper drones (e.g., a second automated light bulb replacement vehicle 101) may be dispatched to provide lighting source. The drones can be deployed in data centers or warehouses where there are only a few people, by flying above the data center racks.

According to an exemplary embodiment of the present invention, multiple types of drones may be used that collaboratively replace light bulbs, with specialization for different activities. For example, a first replacement drone (e.g., the automated light bulb replacement vehicle 101) may replace light bulbs 105, and may retrieve burnt out bulbs for recycling. The replacement drone may have a relatively small load capacity, and thus a storage drone may store and provide replacement bulbs. The storage drone may have a relatively larger storage capacity, which may reduce maneuverability. The replacement drone may be relatively small, which may allow the replacement drone to approach a variety of different light fixtures and mounting structures. Light bulbs 105 may be organized in a cartridge system (e.g., light bulb cartridge 230, described below in more detail), where an entire cartridge including one or more replacement bulbs can be transferred from a supply drone to a bulb replacement drone.

Drones may collaboratively manage the changing of bulbs in large venues such as sports stadiums and concert halls. Drones may employ vision, coupled with capability to infer and comprehend current activities of large masses in the context and location target. This information can be used to predict activities of the crowd and/or operation of machinery, for example, in manufacturing plants or storage or data center buildings. Algorithms, such as NTT, can be used to monitor and predict activities of the humans which will help drones identify the right timing of bulb changes. Drones may collaborate and join forces when changing lights under different contexts, e.g. street lights in remote areas, helper drones may be dispatched to provide lighting source.

According to an exemplary embodiment of the present invention, the light bulb 105 and the light bulb receptacle 111 may be disposed in a light bulb cartridge 230. The light bulb cartridge 230 may be a self-contained unit which can be attached to and detached from a light pole 120. The cartridge may be configured to house any desired type of light bulb within a cartridge including a single type of attachment point for the light bulb coupling/decoupling mechanism 109. That is, the light bulb cartridge 230 may be easily detached from the light pole 120 without twisting a light bulb 105 out of a traditional light bulb socket, thus simplifying the removal process of the light bulb 105 and light bulb receptacle 111. The light bulb coupling/decoupling mechanism 109 may be configured to engage the light bulb cartridge 230 for removal of the light bulb cartridge 230 without the assistance of more than one automated light bulb replacement vehicle 101.

According to an exemplary embodiment of the present invention, the automated light bulb replacement vehicle 101 may include a network interface 103 configured to transmit the at least one of the location data, the type data, and the installation history data corresponding to the at least one light bulb 105 and read from an RFID tag by an RFID reader to the database, which is described in more detail below with reference to FIG. 4.

Figure 5:
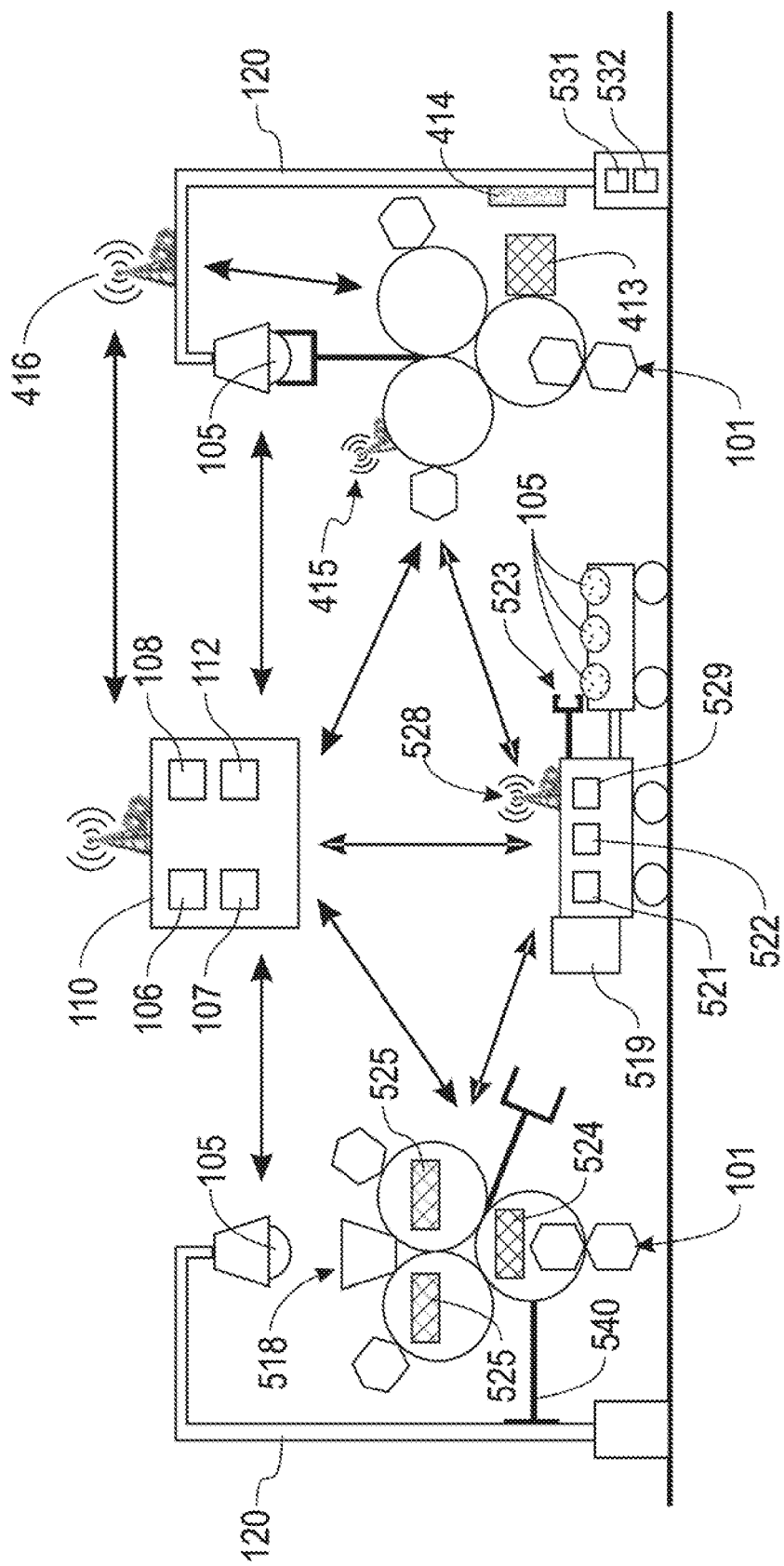
FIG. 5 illustrates a light bulb replacement system including an automated light bulb supply vehicle according to an exemplary embodiment of the present invention.

FIG. 4 illustrates a light bulb replacement system including an RDID tag and reader according to an exemplary embodiment of the present invention. FIG. 5 illustrates a light bulb replacement system including an automated light bulb supply vehicle according to an exemplary embodiment of the present invention.

Referring to FIGS. 4 and 5, the light pole 120 may include a fourth processor 531 and a fourth memory 532. The fourth processor 531 and the fourth memory 532 may monitor and record a state of the light bulb 105 associated with the light pole 120. Thus, the light pole 120 may communicate a status of the light bulb 105 associated with the light pole 120 to the database 110 and/or directly to one or more automated light bulb replacement vehicles 101. For example, light pole 120 may communicate a status of the light bulb 105 associated with the light pole 120 to the database 110 and/or directly to one or more automated light bulb replacement vehicles 101 through a fourth communication antenna 416. The one or more automated light bulb replacement vehicles 101 may each include a third communication antenna for communication with the light pole 120 and/or the database 110, and/or another of the automated light bulb replacement vehicles 101.

According to an exemplary embodiment of the present invention, the automated light bulb replacement vehicle 101 may include a radio-frequency identification (RFID) reader 413 configured to read an RFID tag 414 disposed near at least one of the light bulbs. At least one of the location data, the type data, and the installation history data corresponding to the at least one light bulb 105 may be read from the RFID tag 414 by the RFID reader 413. The RFID tag 414 may be a digital tag (e.g., displayed on a display screen such as an LCD or LED screen) that is modified by the fourth processor 531 to display readable information regarding the light bulb 105 to the RFID reader 413.

The RFID tag may be omitted and the light pole 120 may be replaced with the processor (e.g., the fourth processor 531), memory (e.g., the fourth memory 532) and/or communication antenna (e.g., fourth communication antenna 416), which may store and transmit data for one or more light bulbs associated with the light pole. Thus, the light pole 120 may communicate information regarding light bulb 105 condition or functioning to the database 110 and/or the automated light bulb replacement vehicle 101.

According to an exemplary embodiment of the present invention, the automated light bulb replacement vehicle 101 may include a spectral sensor 518 configured to detect spectral characteristics of each light bulb 105 in the replacement list. Each light bulb 105 in the replacement list might be replaced only when corresponding spectral characteristics are abnormal.

According to an exemplary embodiment of the present invention, a database of spectral characteristics for one or more desired types of light bulbs (e.g., LED, CFL, fluorescent, and incandescent) may be generated and stored (e.g., in the third memory 108), or may be accessed by the automated light bulb replacement vehicle 101 (e.g., through the network interface 103). Thus, the database of spectral characteristics may be used to compare the current spectral emissions from a particular light bulb 105 measured by the spectral sensor 518 to determine if the light bulb 105 is nearing the end of its life space. A more detailed description of spectral characteristics of exemplary types of light bulbs 105 is provided below with reference to FIG. 7.

According to an exemplary embodiment of the present invention, the light bulb replacement system may include an automated light bulb supply vehicle 519 including a second location sensor 529 configured to detect a current location of the automated light bulb supply vehicle 519; a second memory 521 configured to store the replacement list, and store the location data, the type data, and the installation history data corresponding to each light bulb 105 in the replacement list; a third processor 522 configured to navigate the automated light bulb supply vehicle 519 to the at least one light bulb 105 in the replacement list in coordination with the automated light bulb replacement vehicle; and a light bulb supply mechanism 523 configured to transfer the new light bulb 105 from the automated light bulb supply vehicle 519 to the automated light bulb replacement vehicle 101. The light bulb supply mechanism 523 may have substantially the same configuration as the light bulb coupling/decoupling mechanism 109 described herein, except that the light bulb supply mechanism 523 may be disposed on the light bulb supply vehicle 519.

According to an exemplary embodiment of the present invention, the automated light bulb supply vehicle 519 may communicate with the database 110 and/or with one or more automated light source replacement vehicles 101 (e.g., via a fifth communication antenna 528 disposed on the automated light bulb supply vehicle 519). A plurality of light bulb supply vehicles 519 may communicate with the database 110 and/or with a plurality of automated light source replacement vehicles 101. For example, each of the light bulb supply vehicles 519 may carry one or more types of light bulbs (e.g., LED, fluorescent and/or incandescent) and may coordinate with one or more of the plurality of automated light source replacement vehicles 101 to deliver the appropriate light bulbs to one or more of the automated light source replacement vehicles 101. That is, an automated light bulb replacement vehicle 101 in need of a fluorescent bulb may communicate with one of the light bulb supply vehicles 519 to rendezvous and exchange the needed bulb. Additionally, the light bulb supply vehicles 519 may be configured to receive light bulb waste (e.g., recycled light bulb material, as discussed below in more detail) or a discarded light bulb cartridge. The light bulb coupling/decoupling mechanism 109 and/or the light bulb supply mechanism 523 may be configured to pass light bulbs 105 and/or material between the automated light bulb replacement vehicle 101 and the light bulb supply vehicles 519.

According to an exemplary embodiment of the present invention, the new light bulb 105 may be one of a plurality of new light bulbs 105 included in a light bulb cartridge (e.g., light bulb cartridge 230). The light bulb supply mechanism 523 of the automated light bulb supply vehicle may be configured to transfer the light bulb cartridge to the automated light bulb replacement vehicle 519.

According to an exemplary embodiment of the present invention, the automated light bulb replacement vehicle 101 may include a recycling mechanism 524 configured to crush the existing light bulb 105 and separate different materials of the existing light bulb 105. The automated light bulb supply vehicle 101 may include a plurality of recycling receptacles 525 configured to respectively store the different materials of the existing light bulb 105 received from the automated light bulb replacement vehicle 101.

The automated light bulb supply vehicle 519 is illustrated as a land based motorized vehicle in FIG. 5, however, exemplary embodiments of the present invention are not limited thereto. For example, a drone having substantially the same configuration as the automated light bulb replacement vehicle 101 describe herein may serve as the automated light bulb supply vehicle 519 described herein.

According to an exemplary embodiment of the present invention, recycling may be initiated in the automated light bulb replacement vehicle 101 (e.g., a drone) by crushing and possibly separating key materials to preserve transport capacity, and transferring crushed bulb matter back to the automated light bulb supply vehicle 519.

According to an exemplary embodiment of the present invention, the automated light bulb replacement vehicle 101 may include a securing arm 540 for securing the automated light bulb replacement vehicle 101 to the light pole 120. The securing arm 540 may hold the automated light bulb replacement vehicle 101 in a desired position while a light bulb 105 is removed, or while recycled material is transferred from the automated light bulb replacement vehicle 101 by the light bulb coupling/decoupling mechanism 109.

Figure 6:
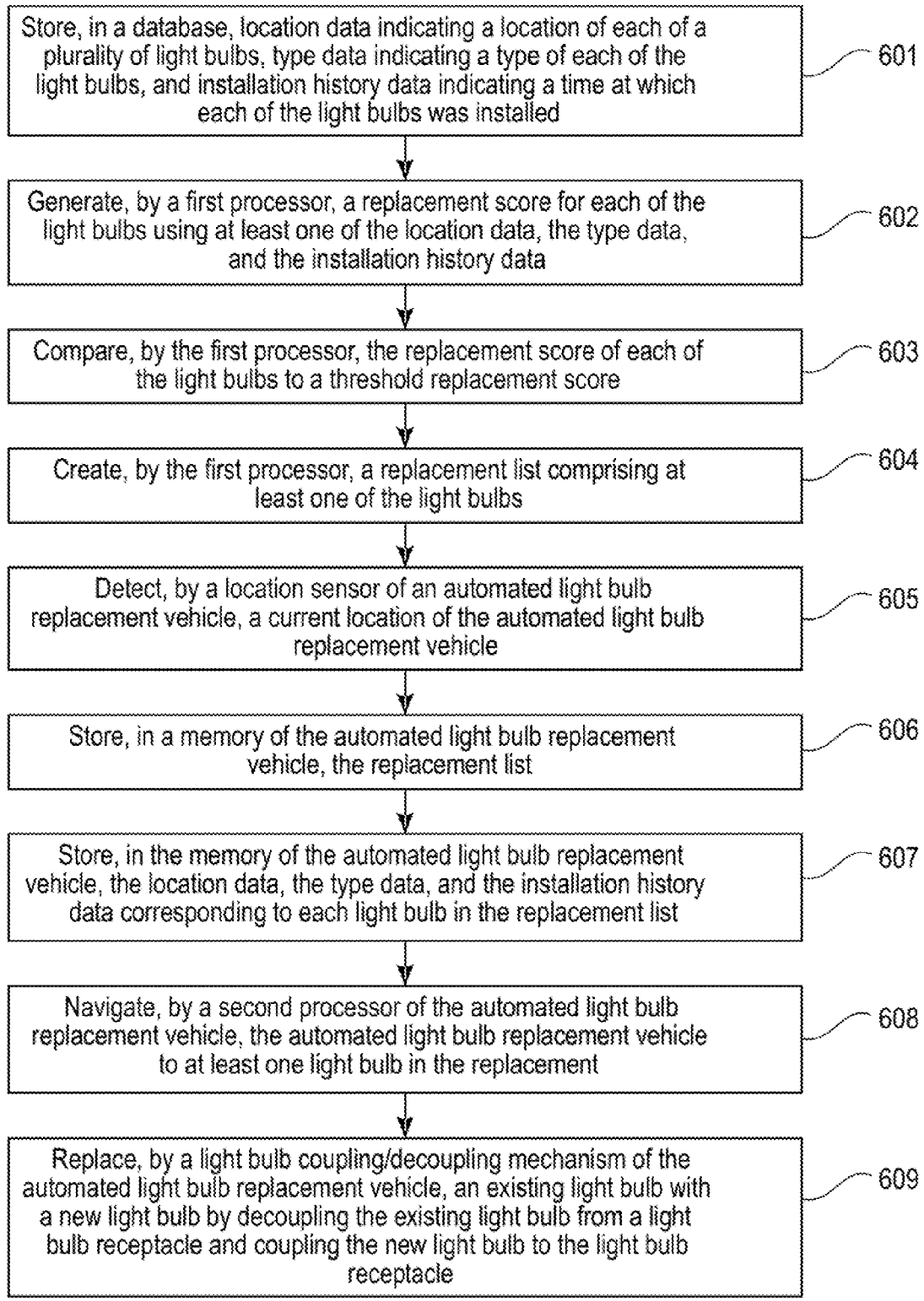
FIG. 6 is a flowchart illustrating a light bulb replacement method according to an exemplary embodiment of the present invention.

FIG. 6 is a flowchart illustrating a light bulb replacement method according to an exemplary embodiment of the present invention.

Referring to FIG. 6, exemplary embodiments of the present invention provide a light bulb replacement method including storing, in a database, location data indicating a location of each of a plurality of light bulbs, type data indicating a type of each of the light bulbs, and installation history data indicating a time at which each of the light bulbs was installed 601. The method includes generating, by a first processor, a replacement score for each of the light bulbs using at least one of the location data, the type data, and the installation history data 602; and comparing, by the first processor, the replacement score of each of the light bulbs to a threshold replacement score 603. The method includes creating, by the first processor, a replacement list comprising at least one of the light bulbs 604. Each light bulb in the replacement list has a replacement score that is higher than the threshold replacement score. The method includes detecting, by a location sensor of an automated light bulb replacement vehicle, a current location of the automated light bulb replacement vehicle 605; and storing, in a memory of the automated light bulb replacement vehicle, the replacement list 606. The method includes storing, in the memory of the automated light bulb replacement vehicle, the location data, the type data, and the installation history data corresponding to each light bulb in the replacement list 607. The method includes navigating, by a second processor of the automated light bulb replacement vehicle, the automated light bulb replacement vehicle to at least one light bulb in the replacement list 608. The method includes replacing, by a light bulb coupling/decoupling mechanism of the automated light bulb replacement vehicle, an existing light bulb with a new light bulb by decoupling the existing light bulb from a light bulb receptacle and coupling the new light bulb to the light bulb receptacle 609.

According to an exemplary embodiment of the present invention, the replacement score may be generated by identifying an average lifetime of each of the light bulbs 105 by cross-referencing the type of each light bulb 105 with average lifetime data that indicates the average lifetime of different types of light bulbs; and determining an expected failure time of each of the light bulbs 105 based on the average lifetime of each light bulb 105 and the installation history data indicating the time at which each light bulb 105 was installed. The replacement scores of the light bulbs 105 may increase as the expected failure times of the light bulbs 105 become closer.

According to an exemplary embodiment of the present invention, the replacement score may be generated by identifying at least one light bulb 105 installed in a high danger area by cross-referencing the location data of each light bulb 105 with high danger data indicating areas in which proper lighting is classified as a safety concern; and increasing the replacement score of the at least one light bulb 105 installed in the high danger area by a predefined amount.

A system of method according to an exemplary embodiment of the present invention may learn about needs for replacement based on history and a history of requests for light bulb 105 replacements. According to an exemplary embodiment of the present invention, the first processor 106 may be configured to generate the replacement score by identifying at least one light bulb 105 that has received a previous replacement request; and increasing the replacement score of the at least one light bulb 105 that has received the previous replacement request by a predefined amount. For example, an individual may manually request replacement of a light bulb 105. The individual manually entering the light bulb replacement request may be someone physically or visually inspecting the light pole 120 associated with a particular light bulb 105. A replacement history request for each of a plurality of light poles 120 may be stored in the database 110 (e.g., in a third memory 108). The replacement history may be employed in determining a burnout rate of particular light pole 120. For example, a particular light pole 120 may be disposed in a high fog area, which experiences greater than normal periods of darkness, and thus light bulbs 105 in such an area may burn out at a faster rate. Thus, the replacement history may indicate that a light bulb 105 associated with a particular light pole 120 may require relatively frequent replacement.

According to an exemplary embodiment of the present invention, energy-efficient bulbs may be used to replace other kinds of bulbs.

According to an exemplary embodiment of the present invention, the light bulb coupling/decoupling mechanism 109 may include a substantially hollow elongated rod member having a predetermined shape, size and length. An extendable member may be disposed within the elongated rod member. A locking means may be used with the rod member and the extendable member for adjusting the length of the apparatus. A replaceable vacuum cup having a predetermined shape may be disposed on a first end of the extendable member for attachment to a light bulb. A vacuum pump may be disposed adjacent to a bottom portion of the rod member, with the pump engageable with the cup for creating a vacuum in the cup for securing a light bulb within. A vacuum release means may be disposed on the pump for releasing the vacuum.

According to an exemplary embodiment of the present invention, the light bulb coupling/decoupling mechanism 109 may include a long handle rod, a chuck at an upper end of the handle rod, and an operating mechanism at a lower end of the handle rod for actuating the chuck. The chuck may include an arm holder, bearing brackets, chuck arms pivotally supported by the bearing brackets, tension springs for closing the chuck arms, a seat pad for receiving and supporting a top surface of the glass sphere (or other shape) of the light bulb, guide bars for opening the chuck arms, and a movable bar-holder-block connected to the operation mechanism for supporting the guide bars. When the movable bar-holder-block is pulled downward by the operating mechanism, the upper end portions of the chuck arms are operatively opened away from one another.

According to an exemplary embodiment of the present invention, the light bulb 105 can be unscrewed and screwed in the bulb holder by an arm as described above that can hold and position the bulb, but it also screws/unscrews it. The new bulb may first be loosely positioned in a socket and tested, before firmly attaching it. If the new bulb does not work, it may be due to a bad bulb or a bad electrical system (e.g. in the light pole 120). For example, the light poles 120 may have structural problems due to age or damage, or they may have had copper wiring stolen at some point. Alternatively, the light poles 120 may include outdated power equipment that can no longer be used.

Figure 7:
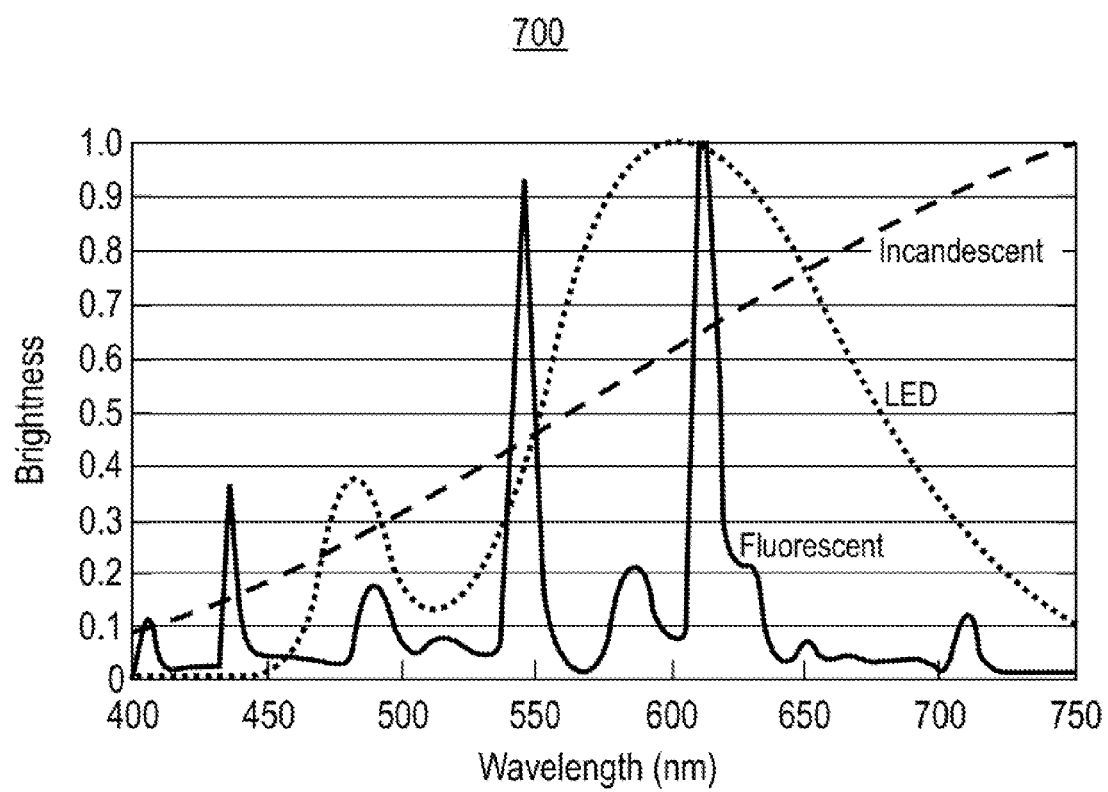
FIG. 7 is a graph illustrating spectral properties of a plurality of light bulbs according to an exemplary embodiment of the present invention.

FIG. 7 is a graph illustrating spectral properties of a plurality of light bulbs according to an exemplary embodiment of the present invention.

Referring to FIG. 7, according to an exemplary embodiment of the present invention, the automated light bulb replacement vehicle 101 may include the spectral sensor 518 configured to detect spectral characteristics of each light bulb 105 in the replacement list. Each light bulb 105 in the replacement list might be replaced when corresponding spectral characteristics are abnormal or when it is determined that a particular light bulb 105 is nearing the end of its expected life span.

According to an exemplary embodiment of the present invention, a database of spectral characteristics for one or more desired types of light bulbs (e.g., LED, CFL, fluorescent, incandescent) may be generated and stored (e.g., in the third memory 108), or may be accessed by the automated light bulb replacement vehicle 101 (e.g., through the network interface 103). The generated and/or stored database may be plotted onto a graph (e.g., graph 700), which may be used to determine where a particular type of light bulb 105 is in its natural lifespan. Thus, the database of spectral characteristics may be used to compare the current spectral emissions from a particular light bulb 105 measured by the spectral sensor 518 to determine if the light bulb 105 is nearing the end of its life space.

Figure 8:
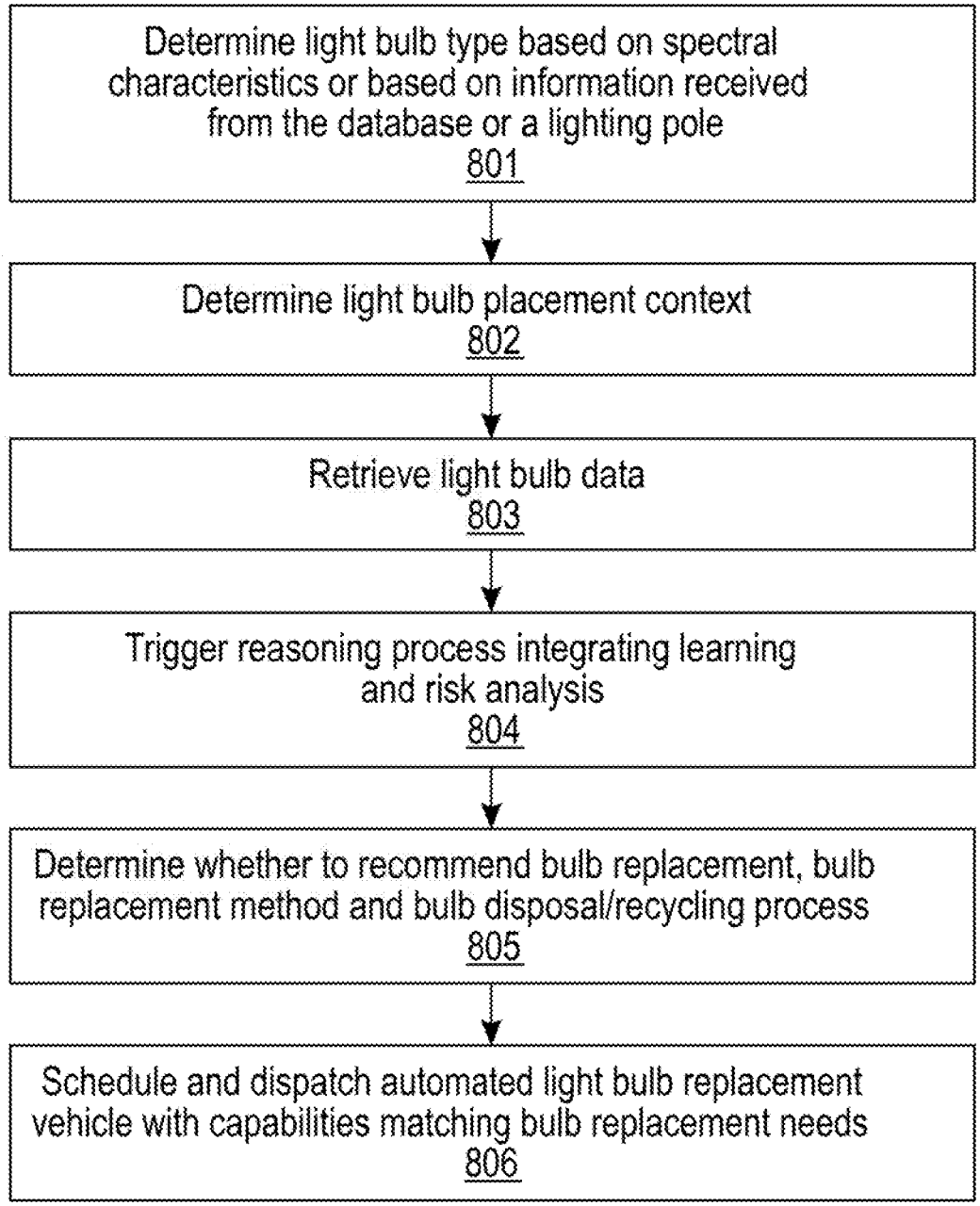
FIG. 8 is a flowchart illustrating a method of risk assessment and bulb replacement triage according to an exemplary embodiment of the present invention.

FIG. 8 is a flowchart illustrating a method of risk assessment and bulb replacement triage according to an exemplary embodiment of the present invention.

Referring to FIG. 8, a method of risk assessment and bulb replacement triage according to an exemplary embodiment of the present invention may include determining light bulb based on spectral characteristics or based on information received from the database or a lighting pole 801. The method may include determining a light bulb replacement context 802. The method may include retrieving light bulb data 603. The method may include triggering a reasoning process integrating learning and risk analysis 604. The method may include determining whether to recommend bulb replacement, a bulb replacement method and a bulb disposal/recycling process 605. The method may include scheduling and dispatching an automated light bulb replacement vehicle (e.g., automated light bulb replacement vehicle 101, such as a drone) with capabilities matching the bulb replacement needs 606.

According to an exemplary embodiment of the present invention, light bulb replacement context may refer to the physical environment around a particular light bulb 105. For example, the light bulb 105 may be in an urban area or a rural area, or may be in a high traffic or relatively inaccessible area.

According to an exemplary embodiment of the present invention, light bulb data may be retrieved from one or more automated light bulb replacement vehicles 101 (e.g., via the first memory 128 and/or second processor 102), from the light pole 120 (e.g., via the fourth memory 532 and/or the fourth processor 531), or the database 110 (e.g., via the third memory 108 and/or the first processor 106).

According to an exemplary embodiment of the present invention, a reasoning process integrating learning and risk analysis may be performed by one or more automated light bulb replacement vehicles 101 (e.g., via the first memory 128 and/or second processor 102), the light pole 120 (e.g., via the fourth memory 532 and/or the fourth processor 531), or the database 110 (e.g., via the third memory 108 and/or the first processor 106).

The reasoning process integrating learning and risk analysis may be applied by a Support Vector Machine (SVM). The SVM may be a supervised learning model, which can be applied to classify light bulbs based on their properties. Function f(x_i) is an SVM classifier associated with class i. x1_xn are data points (a feature vector representing properties of the light bulbs).

Light bulb types may be identified by spectral characteristics, bulb recognition using deep neural nets, a database of bulb types and locations, a broadcast of bulb type by the light or its receptacle and pole (e.g., via the fourth communication antenna 416 and/or via the RFID tag 414).

The desire/need for bulb replacement may be based on the estimated "need," such as a dangerous road intersection, or a high-crime area. A database of needs may be accessed and maintained. Thus, triage can be performed based on which bulbs are most critical to replace. For example, light bulbs 105 that illuminate a complex intersection requiring maximum lighting to avoid traffic accidents may be prioritized for the earliest possible replacement). The placement context of the light bulb 105 may be used to evaluate risk analysis, which may also include the danger of a human accessing the light. Thus, a risk computation may be performed to determine which particular light bulbs have the highest replacement priority.

According to an exemplary embodiment of the present invention, the risk computation according to an exemplary embodiment of the present invention may employ the following algorithm. The risk computation may be defined in the frequentist context. It is obtained by taking the expected value with respect to the probability distribution, $P\theta$, of the observed data, X. This is also referred to as the risk function of the decision rule $\delta$ and the parameter $\theta$. Here the decision rule depends on the outcome of X. The risk function is given by:

$$R(\theta,\delta) = E_\theta L(\theta,\delta(X)) = \int_X L(\theta\delta(\chi)) d P_\theta(\bullet).$$

Here, $\theta$ is a fixed but possibly unknown state of nature, X is a vector of observations stochastically drawn from a population, $E_\theta$ is the expectation over all population values of X, $dP\theta$ is a probability measure over the event space of X (parametrized by $\theta$) and the integral is evaluated over the entire support of X.

For example, if a determined risk value is higher than a predetermined threshold, then replacement of a light bulb may be ordered.

The system and method according to one or more exemplary embodiments of the present invention may learn based on a history of requests for an area or lamp post (which could be affected by weather, exposure to rain/snow/ice, vandalism, and a history of requests to replace). The system and method according to one or more exemplary embodiments may generate a higher replacement score in areas of high traffic accidents, areas in need of energy saving, or areas with difficulty of human access. The system and method according to one or more exemplary embodiments can determine bulb type, and then trigger the associated appropriate physical removal methodology (e.g., cartridge replacement, bulb replacement, or use of the securing arm 540).

Figure 9:
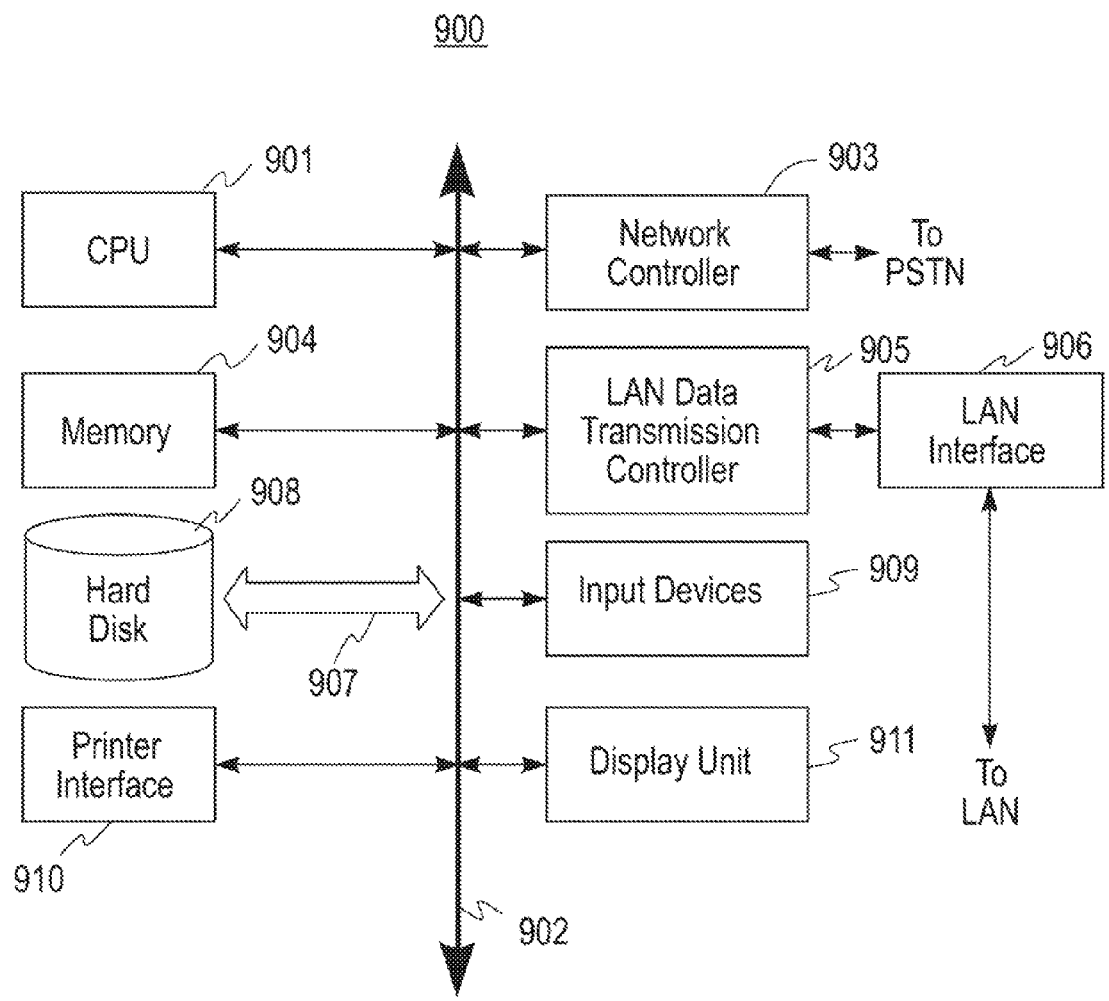
FIG. 9 illustrates an example of a computer system capable of implementing the methods according to exemplary embodiments of the present invention.

FIG. 9 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 901, random access memory (RAM) 904, a printer interface 910, a display unit 911, a local area network (LAN) data transmission controller 905, a LAN interface 906, a network controller 903, an internal bus 902, and one or more input devices 909, for example, a keyboard, mouse etc. As shown, the system 900 may be connected to a data storage device, for example, a hard disk, 908 via a link 907.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A light bulb replacement system, comprising:
   a database that stores location data indicating a location of each of a plurality of light bulbs, type data indicating a type of each of the light bulbs, and installation history data indicating a time at which each of the light bulbs was installed;
   a first processor configured to:
      generate a replacement score for each of the light bulbs using at least one of the location data, the type data, and the installation history data;
      compare the replacement score of each of the light bulbs to a threshold replacement score; and
      create a replacement list comprising at least one of the light bulbs, wherein each light bulb in the replacement list has a replacement score that is higher than the threshold replacement score; and
   an automated light bulb replacement vehicle, comprising:
      a first location sensor configured to detect a current location of the automated light bulb replacement vehicle;
      a first memory configured to store the replacement list, and store the location data, the type data, and the installation history data corresponding to each light bulb in the replacement list;
      a second processor configured to navigate the automated light bulb replacement vehicle to at least one light bulb in the replacement list; and
      a light bulb coupling/decoupling mechanism configured to replace an existing light bulb with a new light bulb by decoupling the existing light bulb from a light bulb receptacle and coupling the new light bulb to the light bulb receptacle.

2. The light bulb replacement system of claim 1, wherein the first processor is configured to generate the replacement score by:
   identifying an average lifetime of each of the light bulbs by cross-referencing the type of each light bulb with average lifetime data that indicates the average lifetime of different types of light bulbs; and
   determining an expected failure time of each of the light bulbs based on the average lifetime of each light bulb and the installation history data indicating the time at which each light bulb was installed,
   wherein the replacement scores of the light bulbs increase as the expected failure times of the light bulbs become closer.

3. The light bulb replacement system of claim 2, wherein the first processor is configured to generate the replacement score by:
   identifying at least one light bulb installed in a high danger area by cross-referencing the location data of each light bulb with high danger data indicating areas in which proper lighting is classified as a safety concern; and
   increasing the replacement score of the at least one light bulb installed in the high danger area by a predefined amount.

4. The light bulb replacement system of claim 3, wherein the high danger area corresponds to an area having a high crime rate or an area having a high vehicle accident rate.

5. The light bulb replacement system of claim 2, wherein the first processor is configured to generate the replacement score by:
   identifying at least one light bulb that has received a previous replacement request; and
   increasing the replacement score of the at least one light bulb that has received the previous replacement request by a predefined amount.

6. The light bulb replacement system of claim 1, wherein the first processor is further configured to:
   identify at least one light bulb installed in a high danger area by cross-referencing the location data of each light bulb with high danger data indicating areas in which proper lighting is classified as a safety concern; and
   prioritize replacement of the at least one light bulb installed in the high danger area.

7. The light bulb replacement system of claim 6, wherein the high danger area corresponds to an area having a high crime rate or an area having a high vehicle accident rate.

8. The light bulb replacement system of claim 1, wherein the first processor is further configured to:
   identify at least one light bulb that has received a previous replacement request; and
   prioritize replacement of the at least one light bulb that has received the previous replacement request.

9. The light bulb replacement system of claim 1, wherein the automated light bulb replacement vehicle further comprises:
   a radio-frequency identification (RFID) reader configured to read an RFID tag disposed near at least one of the light bulbs,
   wherein at least one of the location data, the type data, and the installation history data corresponding to the at least one light bulb is read from the RFID tag by the RFID reader.

10. The light bulb replacement system of claim 9, wherein the automated light bulb replacement vehicle further comprises:
    a network interface configured to transmit the at least one of the location data, the type data, and the installation history data corresponding to the at least one light bulb and read from the RFID tag by the RFID reader to the database.

11. The light bulb replacement system of claim 1, wherein the automated light bulb replacement vehicle further comprises:
    a spectral sensor configured to detect spectral characteristics of each light bulb in the replacement list, wherein each light bulb in the replacement list is replaced only when corresponding spectral characteristics are abnormal.

12. The light bulb replacement system of claim 1, further comprising:
    an automated light bulb supply vehicle, comprising:
       a second location sensor configured to detect a current location of the automated light bulb supply vehicle;
       a second memory configured to store the replacement list, and store the location data, the type data, and the installation history data corresponding to each light bulb in the replacement list;
       a third processor configured to navigate the automated light bulb supply vehicle to the at least one light bulb in the replacement list in coordination with the automated light bulb replacement vehicle; and
       a light bulb supply mechanism configured to transfer the new light bulb from the automated light bulb supply vehicle to the automated light bulb replacement vehicle.

13. The light bulb replacement system of claim 12,
wherein the automated light bulb replacement vehicle comprises a recycling mechanism configured to crush the existing light bulb and separate different materials of the existing light bulb,
wherein the automated light bulb supply vehicle comprises a plurality of recycling receptacles configured to respectively store the different materials of the existing light bulb received from the automated light bulb replacement vehicle.

14. The light bulb replacement system of claim 12, wherein the new light bulb is one of a plurality of new light bulbs included in a light bulb cartridge, and the light bulb supply mechanism of the automated light bulb supply vehicle is configured to transfer the light bulb cartridge to the automated light bulb replacement vehicle.

15. A light bulb replacement system, comprising:
a database that stores location data indicating a location of each of a plurality of light bulbs, type data indicating a type of each of the light bulbs, and installation history data indicating a time at which each of the light bulbs was installed;
a first processor configured to create a replacement list comprising at least one of the light bulbs, wherein the replacement list is created based on at least one of the location data, the type data, and the installation history data; and
an automated light bulb replacement vehicle, comprising:
a location sensor configured to detect a current location of the automated light bulb replacement vehicle;
a memory configured to store the replacement list, and store the location data, the type data, and the installation history data corresponding to each light bulb in the replacement list;
a second processor configured to navigate the automated light bulb replacement vehicle to at least one light bulb in the replacement list; and
a light bulb coupling/decoupling mechanism configured to replace an existing light bulb with a new light bulb by decoupling the existing light bulb from a light bulb receptacle and coupling the new light bulb to the light bulb receptacle.

16. The light bulb replacement system of claim 15, wherein the first processor is further configured to:
identify at least one light bulb installed in a high danger area by cross-referencing the location data of each light bulb with high danger data indicating areas in which proper lighting is classified as a safety concern; and
prioritize replacement of the at least one light bulb installed in the high danger area,
wherein the high danger area corresponds to an area having a high crime rate or an area having a high vehicle accident rate.

17. The light bulb replacement system of claim 15, wherein the first processor is further configured to:
identify at least one light bulb that has received a previous replacement request; and
prioritize replacement of the at least one light bulb that has received the previous replacement request.

18. A light bulb replacement method, comprising:
storing, in a database, location data indicating a location of each of a plurality of light bulbs, type data indicating a type of each of the light bulbs, and installation history data indicating a time at which each of the light bulbs was installed;
generating, by a first processor, a replacement score for each of the light bulbs using at least one of the location data, the type data, and the installation history data;
comparing, by the first processor, the replacement score of each of the light bulbs to a threshold replacement score;
creating, by the first processor, a replacement list comprising at least one of the light bulbs, wherein each light bulb in the replacement list has a replacement score that is higher than the threshold replacement score;
detecting, by a location sensor of an automated light bulb replacement vehicle, a current location of the automated light bulb replacement vehicle;
storing, in a memory of the automated light bulb replacement vehicle, the replacement list;
storing, in the memory of the automated light bulb replacement vehicle, the location data, the type data, and the installation history data corresponding to each light bulb in the replacement list;
navigating, by a second processor of the automated light bulb replacement vehicle, the automated light bulb replacement vehicle to at least one light bulb in the replacement list; and
replacing, by a light bulb coupling/decoupling mechanism of the automated light bulb replacement vehicle, an existing light bulb with a new light bulb by decoupling the existing light bulb from a light bulb receptacle and coupling the new light bulb to the light bulb receptacle.

19. The light bulb replacement method of claim 18, wherein the replacement score is generated by:
identifying an average lifetime of each of the light bulbs by cross-referencing the type of each light bulb with average lifetime data that indicates the average lifetime of different types of light bulbs; and
determining an expected failure time of each of the light bulbs based on the average lifetime of each light bulb and the installation history data indicating the time at which each light bulb was installed,
wherein the replacement scores of the light bulbs increase as the expected failure times of the light bulbs become closer.

20. The light bulb replacement method of claim 19, wherein the replacement score is generated by:
identifying at least one light bulb installed in a high danger area by cross-referencing the location data of each light bulb with high danger data indicating areas in which proper lighting is classified as a safety concern; and
increasing the replacement score of the at least one light bulb installed in the high danger area by a predefined amount.

* * * * *